(12) United States Patent
Beesley

(10) Patent No.: US 7,072,880 B2
(45) Date of Patent: Jul. 4, 2006

(54) INFORMATION RETRIEVAL AND ENCODING VIA SUBSTRING-NUMBER MAPPING

(75) Inventor: Kenneth R. Beesley, Meylan (FR)

(73) Assignee: Xerox Corporation, Stamford, CT (US)

( * ) Notice: Subject to any disclaimer, the term of this patent is extended or adjusted under 35 U.S.C. 154(b) by 730 days.

(21) Appl. No.: 10/216,915

(22) Filed: Aug. 13, 2002

(65) Prior Publication Data

US 2004/0034656 A1 Feb. 19, 2004

(51) Int. Cl.
G06F 17/30 (2006.01)
(52) U.S. Cl. .................. 707/2; 707/102; 707/104.1; 704/2; 704/9; 704/10; 341/78
(58) Field of Classification Search ............... 707/102, 707/104.1, 2; 704/2, 9, 10; 341/62, 78, 341/80
See application file for complete search history.

(56) References Cited

U.S. PATENT DOCUMENTS

| 5,325,091 | A | | 6/1994 | Kaplan et al. ................. 341/31 |
| 5,500,920 | A | * | 3/1996 | Kupiec ..................... 704/270.1 |
| 5,523,946 | A | | 6/1996 | Kaplan et al. ............... 364/364 |
| 5,551,026 | A | | 8/1996 | Kaplan et al. ............... 395/395 |
| 5,551,049 | A | | 8/1996 | Kaplan et al. ............... 395/364 |
| 5,553,283 | A | | 9/1996 | Kaplan et al. ............... 395/395 |
| 5,642,522 | A | | 6/1997 | Zaenen et al. ............... 395/794 |
| 5,706,364 | A | * | 1/1998 | Kopec et al. ................ 382/159 |
| 5,706,400 | A | * | 1/1998 | Omlin et al. ................. 706/16 |
| 5,754,847 | A | | 5/1998 | Kaplan et al. ............... 395/364 |
| 5,787,386 | A | | 7/1998 | Kaplan et al. ............... 704/704 |
| 5,790,599 | A | * | 8/1998 | Wright et al. ................ 375/240 |
| 5,950,184 | A | * | 9/1999 | Karttunen ....................... 707/1 |

(Continued)

OTHER PUBLICATIONS

Word Finder Plus, *Macintosh Version*, Microlytics, Inc., pp. 2-12, 1992.
XeLDA the Linquistic Engine, "XeLDA Overview," *Xerox Multilingual Knowledge Management Solutions*, pp. 4-37, Jun. 2002.
Appel, A. and Jacobson, G., "The world's fastest scrabble program", in Communications of the ACM, 31(5):572-578, 1998.
Beesley, K. R., "Constraining separated morphotactic dependencies in finite-size grammars", in FSMNLP-98, pp. 118-127, Bilkent. Bilkent University, 1998.
Karttunen, L., Kaplan, R.M., and Zaenen, A., "Two-level morphology with composition", in COLING'92, pp. 141-148, Nantes, France, 1992.

(Continued)

*Primary Examiner*—Leslie Wong
(74) *Attorney, Agent, or Firm*—Oliff & Berridge, PLC

(57) ABSTRACT

A finite-state network that supports substring-number mapping is compiled from a grammar that includes a plurality of classes of substrings. Each of the plurality of classes of substrings has a finite number of substrings. In applying the network to an input string, substrings are identified in the input string. Some or all of the substrings identified in the input string are mapped to a unique index within their class. This unique index is labeled with an identifier that identifies its class to define a labeled index. The string is encoded by forming a set of labeled indices using the labeled index of each substring of the input string.

25 Claims, 11 Drawing Sheets

U.S. PATENT DOCUMENTS

| | | |
|---|---|---|
| 6,233,580 B1 | 5/2001 | Kaplan et al. .............. 707/707 |
| 6,239,727 B1 * | 5/2001 | Crochemore et al. ......... 341/51 |
| 6,278,973 B1 * | 8/2001 | Chung et al. ............... 704/257 |
| 2002/0168664 A1 * | 11/2002 | Murray et al. ................. 435/6 |

OTHER PUBLICATIONS

Koskenniemi, K., "Two-level morphology: A general computational model for word form recognition and production", in Publication 11, University of Helsinki, Deparment of General Linguistics, Helsinki, 1983.

Lucchesi, C. L. and Kowaltowski, T., "Applications of finite automata representing large vocabularies", in Software-Practice and Experience, 23(1):15-30, 1993.

Bauer, D., Segond, F., Zaenen, A., "LOCOLEX: The Translation Rolls off Your Tongue", in Proceedings of the conference of the Association for Computers and the Humanities and the Association for Literary and Linguistic Computing, (ACH-ALLC'95) Santa Barbara, USA, Jul. 1995.

* cited by examiner

```
word2num (string, StartState) {
  CurrentState = StartState ;
  WordCount = 0 ;
  Char = 1st letter of string ;

while (CurrentState) {
    if (CurrentState.isFinal) {
      if (no more letters in string) {
        return WordCount ;
      } else {
        WordCount++ ;
      }
    }

CurrentArc = First Arc of Current State ;
    CurrentState = NULL ;

while (CurrentArc) {
      if (CurrentArc.label == Char) {
        CurrentState = CurrentArc.destination ;
      Char = next letter of string ;
        break ;
      } else {
        WordCount += CurrentArc.destination.count ;
        CurrentArc = CurrentArc.next ;
      }
    }
  }
  return Failure ;
}
```

FIG. 4
(PRIOR ART)

```
num2word (index, StartState) {
  Destination = NULL ;
  CurrentState = StartState ;
  WordCount = index ;
  Word = "" ;

while (CurrentState) {
    if (CurrentState.isFinal) {
      if (WordCount == 0) {
        return (Word) ;
      } else {
        WordCount-- ;
      }
    }

CurrentArc = First Arc of Current State ;
    CurrentState = NULL ;

while (CurrentArc) {
      Destination = CurrentArc.destination ;
      if (Destination.count <= WordCount) {
        WordCount -= Destination.count ;
        CurrentArc = CurrentArc.next ;
      } else {
        Word .= CurrentArc.label ;
        CurrentState = Destination ;
        break ;
      }
    }
  }
  return Failure ;
}
```

*FIG. 5*
(PRIOR ART)

```
# top-level call
morph2num(Network, String) {
  m2n(StartState(Network), String, "", 0, False) ;
}
# recursive m2n method
m2n(CurrentState, String, Buffer, Count, InDomain) {
  # explore epsilon transitions from the current state
  foreach t upperEpsilonTransitions(CurrentState) {
    m2n(destination(t), String, Buffer, Count, InDomain) ;
  }
  # test for success
  if (length(String) == 0) {
    # no more input symbols
    if (isFinalState(CurrentState)) {
      # successful traversal
      if (InDomain)
        Buffer .= to_string(Count) ;
      print Buffer ;
    } # else fail
    return;
  }
  # explore transitions matching the next input symbol from String
  foreach t upperValidTransitions(CurrentState, String[0]) {
    if (isStartNumberDiacritic(String[0])) {
      B2 = Buffer ;
      if (InDomain) {
        #  previous domain terminated by start of new domain
        B2 = Buffer . to_string(Count) ;
      }
      m2n(destination(t), String + 1, B2 . String[0], 0, True) ;
    }
    else if (isEndNumberDiacritic(String[0])) {
      # explicit end-of-domain marker
      m2n(destination(t), String + 1,
          Buffer . to_string(Count) . String[0], 0, False);
    }
    else { # normal alphabetic symbol
      C2 = Count ;
      if (InDomain) {
        C2 += sumBypassedCounts(CurrentState, t) ;
      }
      m2n(destination(t), String + 1, Buffer, C2, InDomain) ;
    }
  }
}
```

FIG. 12

INFORMATION RETRIEVAL AND ENCODING VIA SUBSTRING-NUMBER MAPPING

BACKGROUND OF THE INVENTION

1. Field of the Invention

The present invention relates generally to the field of formal language theory and more particularly to the field of computerized string-number mapping using finite-state machines.

2. Background of the Invention

Word-to-number and number-to-word mapping have been used for years and the techniques have been published in various places (see for example the publications entitled: "The World's Fastest Scrabble Program", by A. Appel and G. Jacobson, published in Communications of the ACM, 31(5):572–578, 1998; "Applications Of Finite Automata Representing Large Vocabularies" by C. L. Lucchesi and T. Kowaltowski, published in Software-Practice and Experience, 32(1):15–30, 1993; and "Finite-State Tools For Language Processing", by Emmanuel Roche, published in ACL'95 (Association for Computational Linguistics), 1995.).

Generally, word-to-number mapping relates each whole string (i.e. "word") in a finite language with a unique integer in a dense range. The published technique is known to work only with finite-state networks that encode a finite language; where the language contains n strings (words), the technique relates each string with a unique integer in the range 0 to (n−1) or, in the trivial Luccesi and Kowaltowsky variant cited above, with an integer in the range 1 to n. A finite-state network that accepts a language is referred to herein as "an acceptor" or "an acceptor network".

The principal use of word-to-number mapping (and the inverse, number-to-word mapping) is as a perfect hashing function, allowing efficient integer-indexed mapping from each whole string to "related information" that includes: definitions, translations, glosses, thesaurus sense groups, or other arbitrary data associated with that whole string.

For example, the following U.S. patents relate to the use of word-to-number mapping, and the inverse number-to-word mapping: U.S. Pat. No. 5,325,091, entitled "Text-Compression Technique Using Frequency-Ordered Array of Word-Number Mappers"; U.S. Pat. No. 5,523,946, entitled "Compact Encoding of Multi-Lingual Translation Dictionaries"; U.S. Pat. No. 5,787,386, entitled "Compact Encoding of Multi-Lingual Translation Dictionaries; and U.S. Pat. No. 5,754,847, entitled "Word/Number and Number/Word Mapping".

Word-number mapping has also been extended to finite-state transducers, see for example U.S. Pat. No. 5,950,184, entitled "Indexing a Database by Finite-State Transducer" (hereinafter referred to as "the '184 patent"). In a typical scenario using the technique disclosed in the '184 patent a transducer is applied to an input word that is ambiguous, yielding multiple output strings. Word-to-number mapping is then performed on the output strings, returning multiple indices. Thus the whole input word is related to a set of numbers, which can be used as indices to retrieve multiple glosses. The English fly, for example, is ambiguous and might, via the mapping of a finite-state transducer, be analyzed as "fly [Verb]" and as "fly [Noun]"; a straightforward English-to-Spanish glossing application would need to retrieve the gloss "volar" for the verb and "mosca" for the noun by using the unique index assigned to each output string by word-to-number mapping.

2.1 Classic Word-Number Mapping

Word-to-number mapping and number-to-word mapping (referred to herein together as "word-number mapping") are described here as background while referring to FIGS. 1–5.

2.2 Preparation for Word-Number Mapping

Before classic word-to-number mapping or number-to-word mapping can be performed using an acceptor network, the acceptor must be pre-processed to add integer counts on the nodes. As an example, a five-word acceptor is shown in FIG. 1.

More specifically, FIG. 1 shows an acceptor for the language consisting of the five words "clear", "clever", "ear", "ever", and "other". The acceptor will accept these five words and will reject all other words. Each word corresponds to a path of labels on the arcs leading from the start state (i.e., the leftmost state shown in FIG. 1) to a final state, which is conventionally represented as a double circle.

The preprocessing performed for word-number mapping may be summarized as follows:

Begin by marking each non-final state with 0 and each final state with 1 as shown in FIG. 2. FIG. 2 shows an acceptor for the language consisting of the five words "clear", "clever", "ear", "ever", and "other", initialized with a count of zero on each non-final node and a count of one on each final node.

Subsequently, consider each state in turn, adding one to the count for each path leading from that state to a final state. The result is shown in FIG. 3. FIG. 3 shows an acceptor for the language consisting of the five words "clear", "clever", "ear", "ever", and "other", completely initialized for word-number mapping with counts on the nodes. Note that 5 strings can be completed from the start state, being the five strings of the language encoded by the acceptor.

2.3 Word-to-Number Mapping

Classic word-to-number mapping and number-to-word mapping work only for finite acceptors, i.e. for networks encoding finite languages. In other words, these classic techniques do not work for networks encoding infinite languages or for transducers.

Word-to-number mapping takes as input a word from the language of the transducer and maps the word to an integer in a dense range from 0 to (n−1), where n is the finite number of strings in the language. (The "dense range" means that there are no gaps in the range; each word corresponds to a unique integer in the dense range 0 to (n−1), and each number in the range corresponds to a unique word). An example of program instructions for performing word-to-number mapping is shown in FIG. 4.

Using the instructions shown in FIG. 4, the words of the language defined by the acceptor in FIG. 3 are mapped to the following integers: clear: 0; clever: 1; ear: 2; ever: 3; other: 4. That is, the five words of the language are mapped to unique integers in the dense range of 0 to (5−1).

2.4 Number-to-Word Mapping

Number-to-word mapping is the inverse operation of word-to-number mapping. For a language of n words, number-to-word mapping maps each integer in the dense range 0 to (n−1) to a unique word in the language. An example of program instructions for performing number-to-word mapping is shown in FIG. 5. In considering the "arcs leading out of the current state", this includes the virtual "exit arc" in the case of final states.

2.5 Summary of Word-Number Mapping

A finite-state network encoding a regular language generally consists of a set of states, one designated as the start state, zero or more designated as final states, and labeled and directed arcs representing transitions from one state to another state. Each path from the start state to a final state corresponds to a word in the language encoded by the network. If the network is non-cyclic, i.e. if it contains no loops and therefore denotes a finite language, the language will have a finite cardinality n.

Word-to-number mapping uses the finite-state network to relate each of the n strings in the language to a unique integer in the dense range 0 to (n−1), and number-to-word mapping is the inverse operation, providing a perfect hash function. The techniques and applications are well described in the literature, especially in the Lucchesi and Kowaltowski paper cited above.

Exit arcs from a state are ordered. In word-to-number mapping, calculation of the unique index number for each whole string in the language of the network involves initializing an index-count to zero, "looking up" the string in the network, i.e. following the path corresponding to the symbols of the string from the start state to a final state, and adding to the index-count the counts on the destination states of arcs that are bypassed, in a lexicographic order, during the process of lookup.

The "lexicographic order" concerns the sorting priority from the beginning to end of the strings in the network (i.e., the primary sort is performed on the first character, within that the next sort is performed on the second character, etc.). While a lexicographic order may suggest that the labeled arcs leaving each state are sorted in alphabetical order, they may alternatively be ordered arbitrarily at each state. In addition, while lexicographic order may suggest that the same ordering of labeled arcs leaving each state is required at each state, it may alternatively be possible for each state to have a unique order arbitrarily different from the ordering of labeled arcs leaving any other state.

Number-to-word mapping is the straightforward inverse of word-to-number mapping. To retrieve a string given its index x, an index count is initialized to x and sets the start state of the network as the current state. From the current state, the counts on the states that can be reached from the current state are examined; and working in lexicographic order, the maximum number of states whose collective count value does not exceed the index-count are bypassed, the index-count is decremented by that collective count, and the next transition to the destination state is followed. That state becomes the new current state, and the technique re-applies repeatedly until the index-count is zero and a final state has been reached. The string of symbols on the path followed is returned as the word corresponding to the original index-count x.

Established techniques of word-number mapping are sensitive only to the real start state and to the real final states of the network. The technique applies only to networks denoting a finite language, indexing whole strings as units. In word-number mapping, there is only one indexing domain for the entire language. The number derived from word-to-number mapping is typically used as an index into an array of pointers (or offsets) into a database containing related information.

Accordingly, it would be advantageous to provide a word-number mapping technique that applies to networks encoding infinite languages with sufficient granularity to operate on substrings of the strings.

SUMMARY OF THE INVENTION

In accordance with the present invention, a specially encoded (finite-state) network is applied to an input string from a formal language and a set of labeled (or somehow distinguished) numbers (i.e., indices) that correspond to substrings of the input string is returned. Generally, this process is referred to herein as "substring-to-number mapping". "Number-to-substring mapping" is the inverse process of returning an input string for a set of labeled numbers. Substring-to-number mapping and number-to-substring mapping are referred to herein together as "substring-number mapping".

One application of substring-number mapping described below involves natural language. Words in natural languages like German and English are composed of morphemes of various kinds, roughly classified into prefixes, stems, and suffixes. There are other kinds of natural-language morphemes, including infixes, circumfixes, and other more involved possibilities. The term morpheme is used herein to describe any component of natural-language words.

When substring-number mapping is applied to formal languages that model natural languages, the most obvious applications will treat the morphemes as the relevant substrings that get mapped to labeled numbers. However, there is no necessary equation of substrings and morphemes. Even when dealing with languages that model natural languages, the substrings in some applications might be syllables, bigrams (i.e., two-letter sequences), trigrams (i.e., three-letter sequences) or generally n-grams of any arbitrary length. Some statistical models of natural languages (e.g., in cryptology) break natural-language words down to n-grams rather than anything a linguist would recognize as morphemes.

One embodiment described below for performing substring-number mapping in accordance with the present invention is sensitive to the real start state, to the real final states, and to substring start and final positions inside a network. The substring start positions mark boundaries where the counts marked on states and the assignment of indexing numbers are started or restarted. Real final states and substring final positions mark the boundaries where counting and indexing terminate. In this way, a single network is partitioned into multiple substring-indexing domains, allowing separate indexing for separate substrings within the overall strings of the language. In natural-language applications, each indexing domain typically corresponds to a class of morphemes (e.g. a set of prefixes, roots or suffixes).

The present invention extends word-number mapping by allowing the possibility that a single input string can be mapped to multiple numbers that correspond to substrings of the input string. This might be performed relative to the language of an acceptor or, extended naturally to transducers, relative to the paths of a transducer. In natural language applications, the substrings would most naturally correspond to morphemes of the input word, and the invention would allow each morpheme or other interesting substring of the input word to be mapped to a number.

The substring-number mapping of the present invention defines multiple indexing domains inside the same network, with each indexing domain corresponding to a set of substrings. When a network is applied to an input word, counting for one domain may be turned off, and then counting for the same or another domain may be turned on. This process of turning on and off indexing domains may be repeated many times for the input word using, for example, diacritics. Advantageously, this allows different levels of granularity to be defined within strings of a language. In addition, this also allows substring-number mapping for looping networks that encode infinite languages or relations.

It will be appreciated however by those skilled in the art that substring-number mapping need not be limited to use with natural language applications and may be applied more generally to other applications such as data encoding and decoding.

In accordance with one aspect of the present invention, there is provided a method, and system and article of manufacture therefor, for encoding an input string. The method includes: specifying a plurality of indexing domains in a finite-state network, where each indexing domain has a delimited set of states and transitions that corresponds to a class of substring; and applying the finite-state network to the input string to produce a set of labeled indices, where the label of each labeled index in the set of labeled indices identifies a class of substring and its associated index identifies a unique substring in the identified class, and where each labeled index in the set of labeled indices corresponds to one of the indexing domains in the finite-state network.

In accordance with another aspect of the present invention, the set of labeled indices is used to map each substring of the input string to related information or to later decode an encoded input string.

BRIEF DESCRIPTION OF THE DRAWINGS

These and other aspects of the invention will become apparent from the following description read in conjunction with the accompanying drawings wherein the same reference numerals have been applied to like parts and in which:

FIG. 4 sets forth prior art example program instructions for performing word-to-number mapping;

FIG. 5 sets forth prior art example program instructions for performing number-to-word mapping;

FIG. 12 sets forth program instructions for performing morpheme-to-number (i.e., substring-to-number) mapping;

DETAILED DESCRIPTION OF THE INVENTION

A. Definitions and Conventions

For the ease of explanation, the invention will be described mainly in respect to natural-language examples, referring most often to words rather than strings, to morphemes rather than substrings and to morpheme-to-number mapping rather than substring-to-number mapping. However, the technique is not limited to natural language and could be used, for example, in indexing gene substrings in DNA or motif substrings in a digitized musical score.

The operation of number-to-morpheme mapping is the straightforward inverse of morpheme-to-number mapping.

A.1 String and Word

In formal language theory, the terms "string" and "word" are used interchangeably. They do not necessarily have anything to do with natural language "words". Strings (i.e., words) are concatenations of "symbols" from an "alphabet". In natural languages, the symbols are usually alphabetic letters, e.g. "dog", "cat" and "elephant"; but strings, words and symbols do not necessarily have anything to do with natural language.

A.2 Language

"Natural languages" include French, English, German, Swahili, etc.

A "language" is defined herein as a set of "strings".

A "finite language" is a set containing a finite number of strings. All finite languages are regular languages, but regular languages may be finite or infinite in size.

A "regular language" can be encoded as a simple finite-state automaton or simple finite-state machine, which are often called acceptors.

A.3 Acceptor, Transducer, Network, Diacritic

An "acceptor" is a data structure, a directed graph consisting of a finite number of states, one of which is designated as the start state, and zero or more of which are designated as final states, with symbol-labeled arcs leading from a state to a state. By convention in the figures, the start state is always the leftmost state and final states are marked by a double circle. Each path through the acceptor, following the labeled arcs from the start state to a final state, corresponds to a string (i.e., word) in the language encoded by the acceptor. The string is the concatenation of the labels on the path of arcs leading from the start state to the final state.

Figure 1:
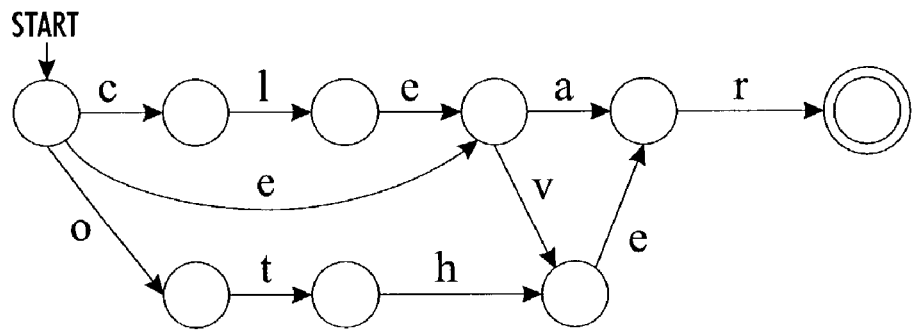
FIG. 1 illustrates an example of an acceptor according to the prior art with all states unmarked.
Figure 2:
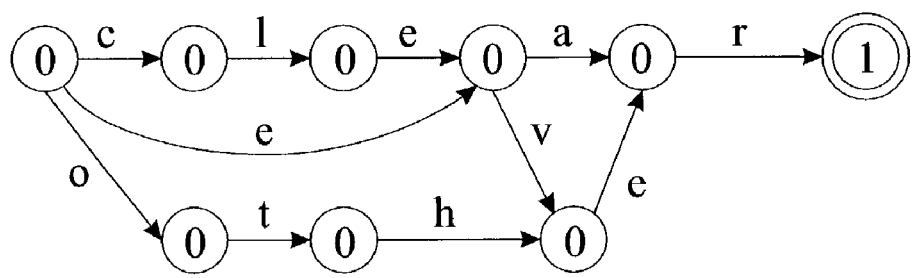
FIG. 2 illustrates the acceptor of FIG. 1 with the non-final states marked with a zero and the final states marked with a one according to the prior art.
Figure 3:
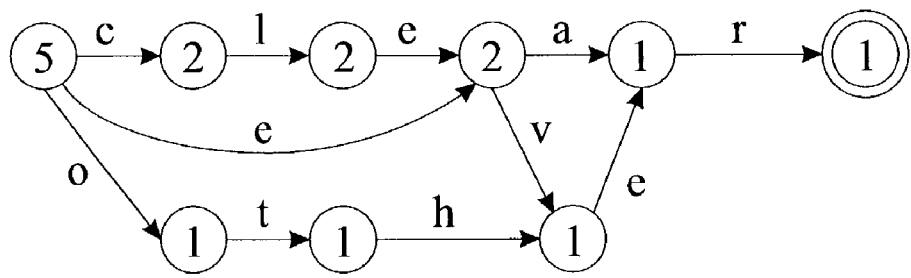
FIG. 3 illustrates the acceptor of FIG. 2 with each state marked with an added one to its count for each path leading from that state to the final state according to the prior art.

An acceptor must often be distinguished from a transducer, which is a slightly more complicated finite-state machine. An acceptor accepts the language which it encodes. For example, FIG. 1 encodes and accepts the language consisting of the five strings (i.e., words) "clear", "clever", "ear", "ever", and "other". The terms "acceptor" and "transducer" may be referred to herein under the collective term "network".

A "diacritic" is a special symbol. It is usually distinct from the input and output symbols of a network, and serves a particular purpose such as delimiting an indexing domain.

An "ordered pair of strings" is a pair of strings (words), generally notated <"first", "second">, where the order is significant. Thus <"first", "second"> is a distinct ordered pair from <"second", "first">. At Xerox Corporation, the pairs are usually visualized vertically, with an upper string paired with a lower string, e.g. <"upper", "lower">, but they could just as validly be visualized as left versus right, or not visualized spatially at all. Where a language is a set of strings, a relation is a set of ordered pairs of strings. A regular relation is encoded as a finite-state transducer, also called an FST (Finite State Transducer). In the figures, a transition arc of a transducer is marked with a pair of symbols, an upper-side symbol and a lower-side symbol, to denote other than an identity pair (i.e., a label that maps a given symbol into that same symbol), and one symbol to denote an identity pair.

The set of strings in the upper-side of a regular relation is a regular language, and the set of strings on the lower-side of a regular relation is a regular language. A regular relation is a mapping between two regular languages.

A.4 Hashing

"Hashing" is the general process of taking a string, performing some kind of algorithmic processing on it, and coming up with a numerical value, typically an integer. Typically this integer is then used as an index into an array serving as a database or dictionary of some sort. Hashing therefore provides a way of directly accessing an array-based dictionary or database entry for a word, using the word itself as the key. Hashing is a very valuable technique in computer science. In practice, traditional hashing schemes may lead to collisions, where multiple words map to the same integer, and to gaps, where some elements of the database array are unused. Better hashing algorithms minimize collisions, and they minimize gaps, which minimizes the waste of storage. One obvious and valuable application of word-number mapping is to perform perfect hashing, mapping words to numbers with no collisions and no gaps in the storage array.

B. System and Method

Figure 6:
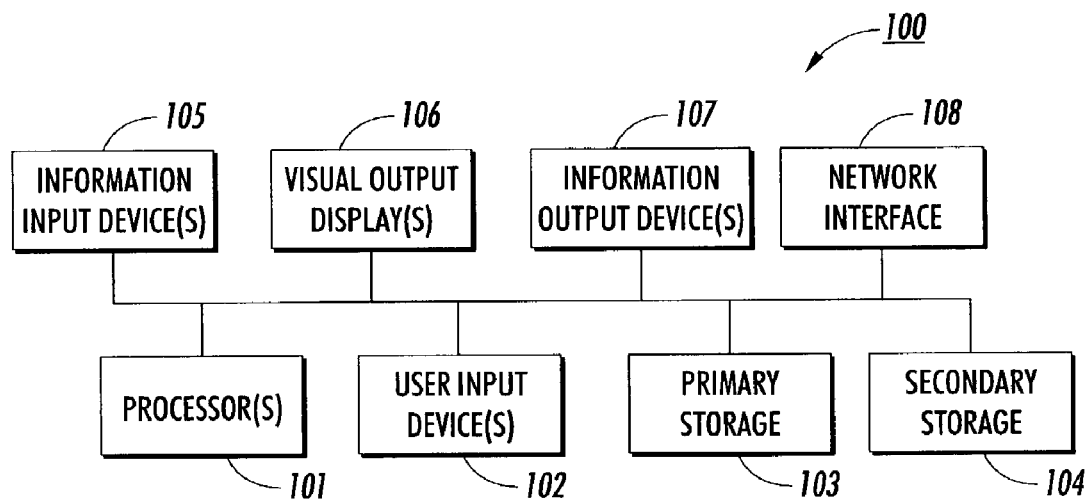
FIG. 6 illustrates a data processing system capable of performing the present invention.

FIG. 6 depicts a data processing system 100 capable of performing the method in accordance with the present invention. The data processing system 100 may comprise any number or combination of processor(s) 101, user input devices 102, primary storage 103, secondary storage 104, information input devices 105, visual output displays 106, information output devices 107 and network interface 108.

The processor(s) 101 comprises a central processing unit, such as a complex-instruction-set-computer (CISC) or reduced-instruction-set-computer (RISC) processor. The user input device(s) 102 comprises a keyboard and a pointing device, such as a mouse. The primary storage 103 comprises read-only memory (ROM) and random-access memory (RAM), and stores software including an operating system (OS), application programs and data. The secondary storage (104) comprises a fixed or removable hard-disk drive, a tape drive, a floppy-disk drive, an optical drive, for example, a CD-ROM drive or digital-versatile-disk (DVD) drive, or the like.

The information input devices 105 comprises visual information input devices, such as a scanner, and audio information input devices, such as an analog-to-digital (A/D) converter. The visual output displays 106, comprises a cathode ray tube (CRT), a flat screen display, a projector, or the like. The information output devices 107 comprises visual information output devices, such as an impact printer, for example a matrix printer or device for outputting Braille, or a non-impact printer, for example a laser printer, and a plotter. The information output devices 107 further comprises audio information output devices, such as a digital-to-analog (D/A) converter. The information output devices 107 further comprises serial, parallel, universal-serial-bus (USB), Firewire and Bluetooth interfaces. The network interface 108 comprises a wired or wireless adapter, for example a local-area-network (LAN), wide-area-network (WAN) or integrated-services-digital-network (ISDN) adapter. As is apparent to a person skilled in the art, a typical data processing system comprises a combination, but not necessarily all of the cited devices.

Figure 7:
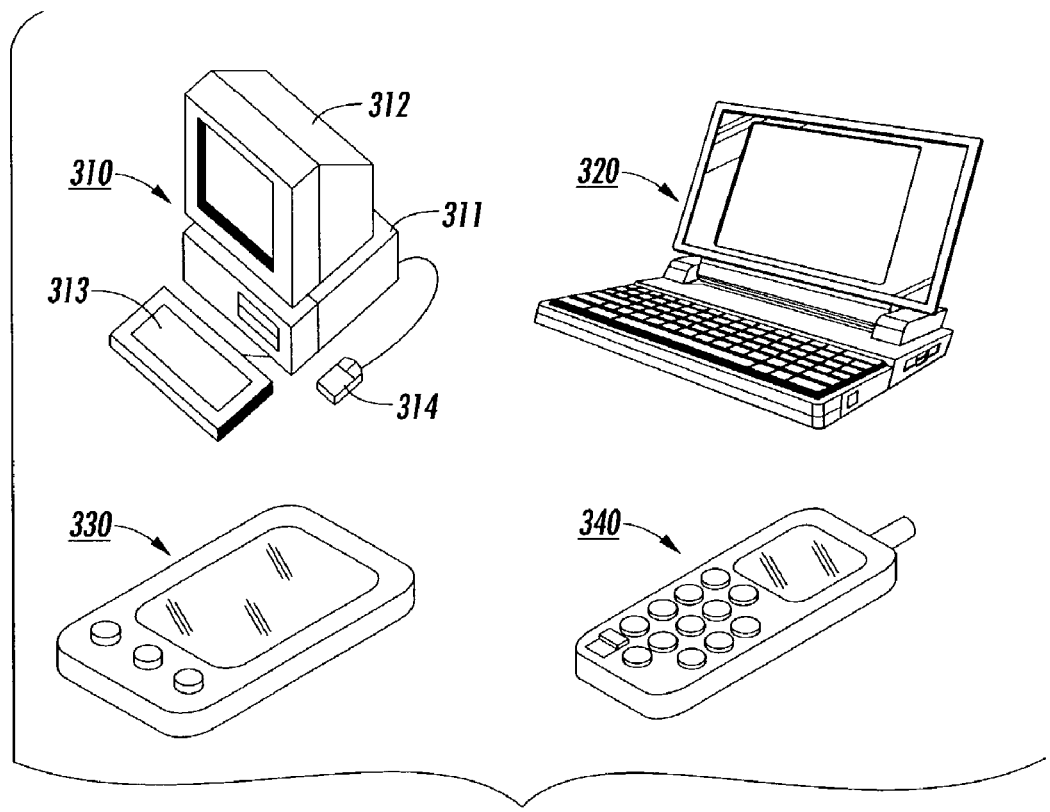
FIG. 7 illustrates various embodiments of the data processing system illustrated in FIG. 6.

FIG. 7 depicts a selection of typical embodiments of the data processing system. The data processing system may be embodied, for example, as a desktop computer 310 comprising a main unit 311, a monitor 312, a keyboard 313 and a mouse 314. The data processing system may also be embodied as a notebook computer 320, personal digital assistant 330, a mobile phone 340, or the like.

The identification of substring start and final positions could be done in many equivalent ways, e.g. with markings inside states themselves, or via external tables. One in particular involves the introduction into the network of diacritic symbols. In what follows, they will be called "number diacritics". It is not important how substring start and final positions are identified: the key points are: (a) the ability to identify substring start and substring final positions for purposes of count-assignment and morpheme-number mapping; and (b) being sensitive to these substring start and final positions as well as to the real start and final states.

For illustration, it is assumed that number diacritics are single symbols with a multicharacter print name ("multi-character symbols" in Xerox terminology), and that they are distinguishable from other symbols by their superficial spelling; arbitrarily, let that spelling consist of alphabetic symbols surrounded with "pound signs", e.g. #VREF#, #STEM#, and #VSUFF#. The name inside the pound signs is chosen at the convenience of the developer and serves as a convenient label of the indexing domain that follows.

Figure 8:
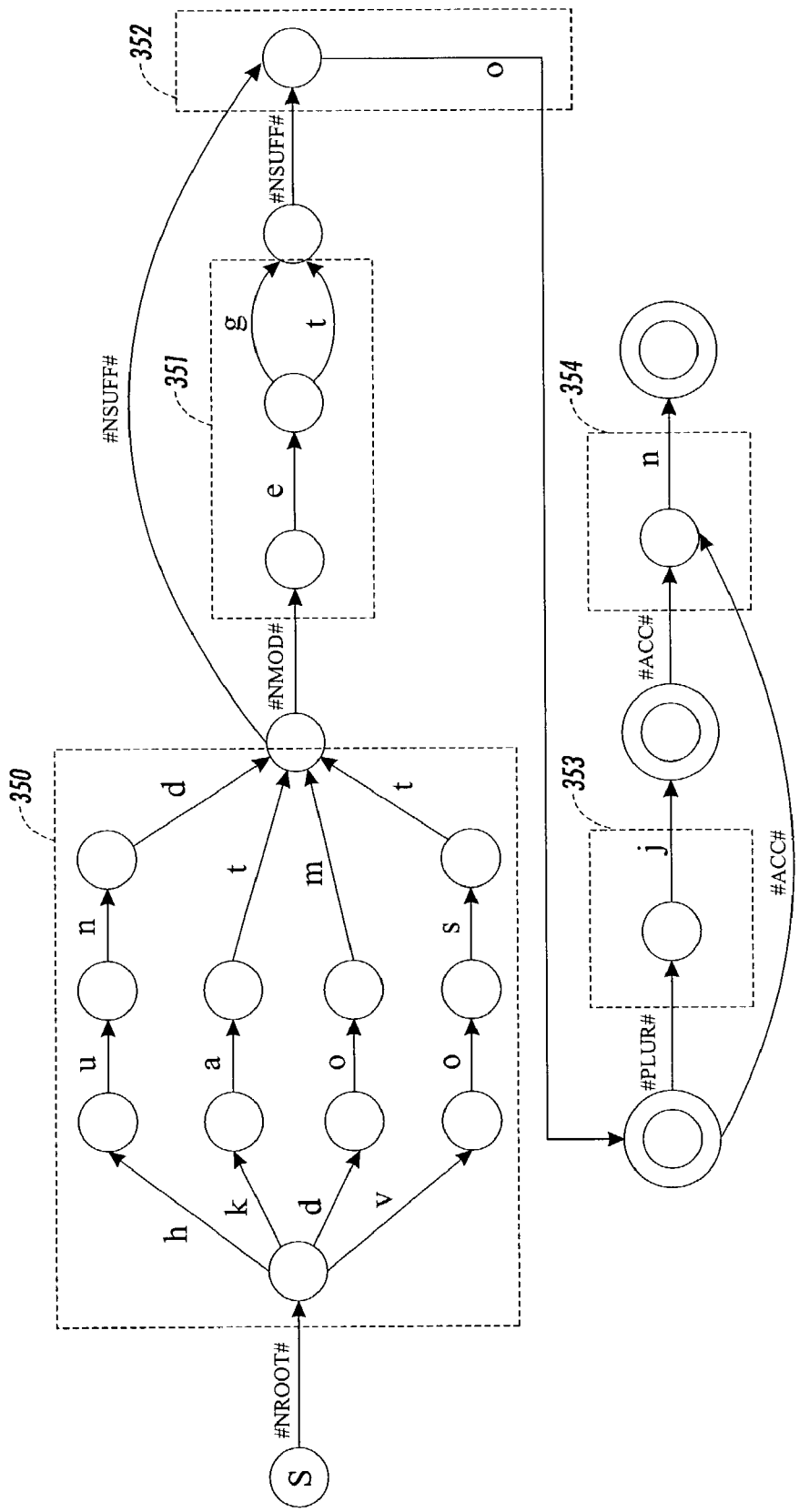
FIG. 8 illustrates an example of a network that could be used to effect substring-to-number mapping with a network in accordance with the present invention.

A network that denotes a simple language is illustrated in FIG. 8. There exist different ways to create the network. The network could have been created through induction. In addition, the network could have been compiled from regular expressions using Xerox Corporation's xfst utility or from notations of equivalent formal power such as Xerox Corporation's lexc language.

The following finite-state grammar in the form of an XFST (Xerox Finite State Tool) script (XFST is an interactive tool developed at Xerox Corporation for defining and manipulation finite-state networks as described in "Xerox Finite-State Tool", by Karttunen et al., Version 6.3.0, published on the Internet at http://www.xrce.xerox.com/competencies/content-analysis/fssoft/docs/fst-97/xfst97.html) models a fragment of the noun system of the Esperanto language. The simple nouns to be modeled start with a noun root and continue with an optional -et (diminutive) or -eg (augmentative) suffix, an obligatory -o suffix (marking the word as a noun), an optional -j plural marker and an optional -n accusative-case marker. An example noun-fragment grammar may be defined using XFST as follows:

```
define NROOT
  hund
  | kat
  | dom
  | vost
define NMOD
  eg
  | et;
define NSUFF
  o;
``` define PLUR j;

define ACC n;

define NOUNFRAGMENT

NROOT# NROOT (#NMOD# NMOD) #NSUFF# NSUFF (#PLUR# PLUR) (#ACC# ACC);

In XFST, the vertical bar (|) indicates union ("or"); the parentheses indicate optionality, and concatenation has no overt operator but is indicated by simple juxtaposition in the expressions. Ignoring the number diacritics, the resulting NOUNFRAGMENT model in this example will generate and recognize such words as hundo, hundetoj, katon, and vostojn.

In the compiled NOUNFRAGMENT network, each morpheme class (i.e., each sublexicon) is preceded by a number diacritic that (for human convenience) has a label that matches the name of the sublexicon as shown in the source grammar. The resulting network, after routine epsilon-arc removal, is shown in FIG. 8.

In FIG. 8 the #NROOT# diacritic marks the start of the indexing domain 350 for Esperanto noun roots; here there are only four possible noun roots, and they will therefore be numbered 0 to 3. Also in this example, the #NMOD# diacritic effectively marks the end of the noun-root indexing domain 350 and the start of the new noun-modifier indexing domain 351. Similarly, the #NSUFF#, #PLUR#, and #ACC# diacritics mark the start of indexing domains 352, 353, and 354, respectively.

Figure 9:
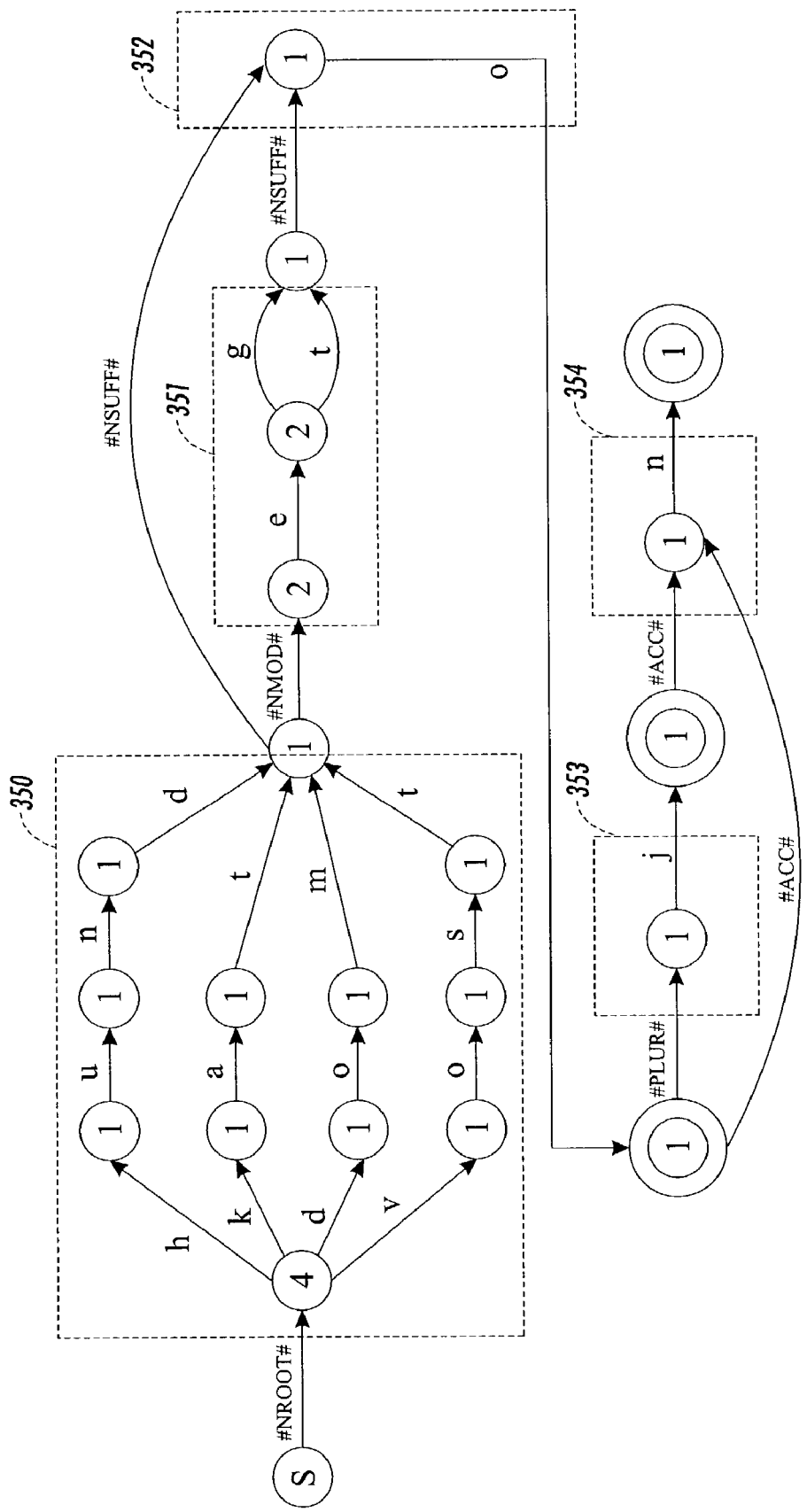
FIG. 9 illustrates the network shown in FIG. 8 after counts have been assigned to each state.

FIG. 9 shows the network in FIG. 8 after it has been traversed from right to left to assign counts to states (represented by nodes). Each state is marked with a count indicating the number of paths leading from that state through either a real final state (as in word-to-number mapping) or to a substring final position; if the state is final or marks a substring final position, the count is then incremented by one. A substring final position in the current example is one which has only number-diacritic arcs leading from it. Another more explicit method of marking substring final states is described below in section B.3.

In use, a slightly modified lookup routine, which treats number diacritics as epsilons for purposes of lookup, looks up the Esperanto word kategoj ("big cats") and returns the string:

"#NROOT# kat #NMOD# eg #NSUFF# o #PLUR# j".

This result string consists of four morphemes, with each morpheme labeled with a number diacritic. The handling of number diacritics as epsilons, when applying the network to a surface word such as kategoj, is equivalent to "upward" application of a transducer that is the identity transducer corresponding to FIG. 9, but with upper-side number diacritics mapping to lower-side epsilons (empty strings), as shown in FIG. 10.

Figure 10:
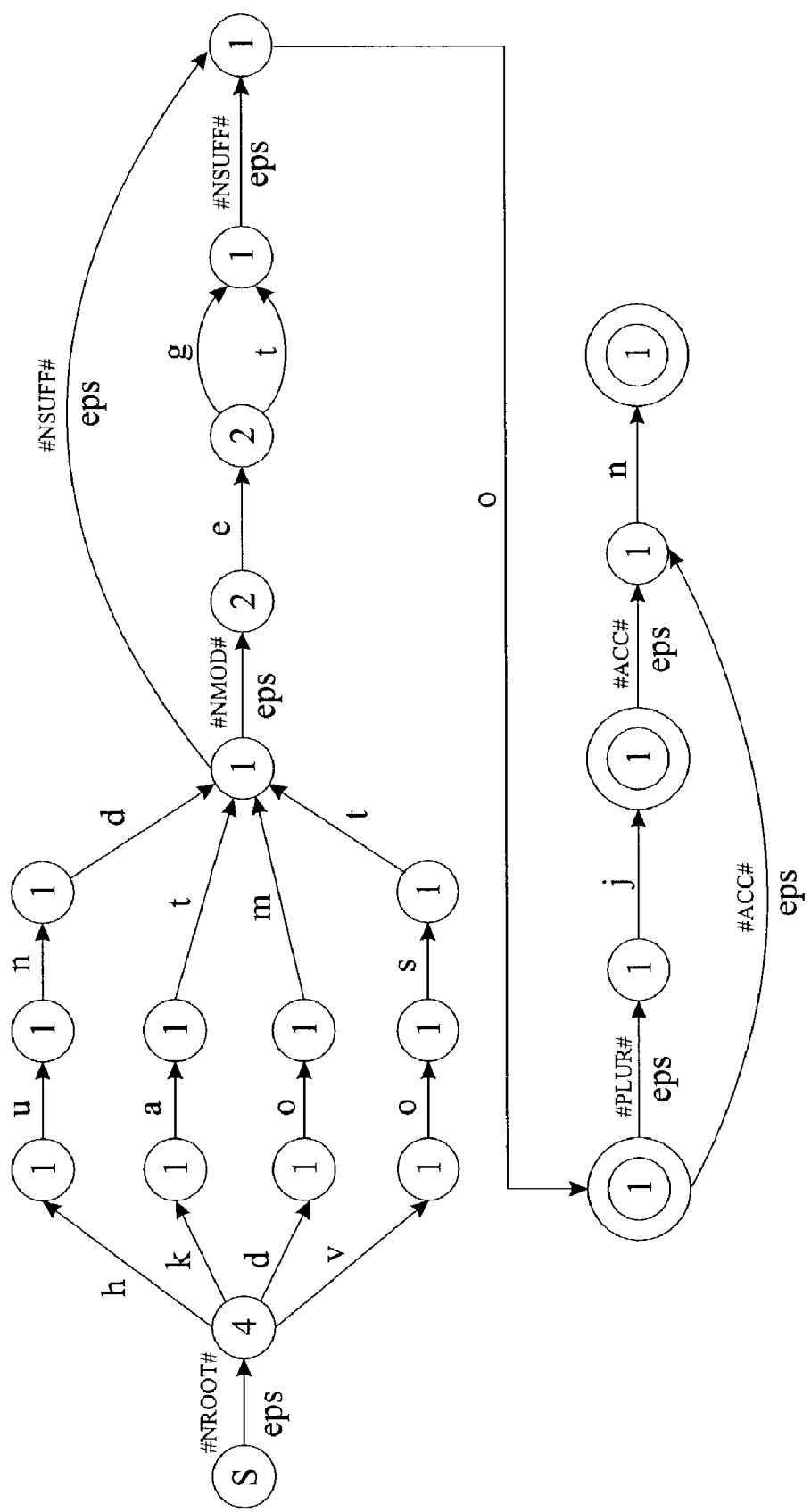
FIG. 10 illustrates an example of a transducer network that could be used to effect substring-to-number mapping in accordance with the present invention.

The application of the transducer shown in FIG. 10 can lead to multiple outputs. For example, if the example noun-fragment grammar defined above also included a root kateg:

define NROOT hund

| kat

| kat eg

| dom

| vost;

then the application of the network to the surface word kategoj would result in the following two "lexical" solutions:

(1) #NROOT# kat #NMOD# eg #NSUFF# o #PLUR# j (2) #NROOT# kat eg #NSUFF# o #PLUR# j consistent with the word's ambiguity.

Morpheme-to-number mapping then reapplies the network to the result strings. For string 1, it returns four labeled index numbers: the NROOT number for morpheme kat, the NMOD number for the suffix morpheme "eg", the NSUFF number for the suffix morpheme o and the PLUR number for the suffix morpheme j. In this case, it might return the following string of labeled integers:

"#NROOT# 1 #NMOD# 0 #NSUFF# 0 #PLUR# 0".

For string 2, morpheme-to-number mapping would return three labeled index numbers: the NROOT number for morpheme kateg, the NSUFF number for the suffix morpheme o and the PLUR number for the suffix morpheme j.

These numbers are then used as indices into four distinct perfect hash tables that are each identified by the label of each index to retrieve the related information associated with each morpheme. While the present example is purposely kept very simple, it is not at all uncommon to find natural languages with words that can contain six or more morphemes, each morpheme being meaningful and potentially deserving its own related information.

If the result strings per se are not interesting in a particular application, an appropriately modified lookup routine can map directly from the input surface string to sets of labeled morpheme index numbers.

B.1 Compounding with Morpheme-to-Number Mapping

It is also common to find productive compounding in natural languages, where a word may contain not only multiple affixes but also multiple root morphemes. Some relatively frozen English examples include doghouse, hambone and eyedrops; but German compounding, for example, is highly productive.

Root-compounding is also possible in Esperanto by modeling it with the following slightly modified definition of NOUNFRAGMENT, where the NROOT morpheme is allowed to appear one or more times (as indicated by the Kleene-plus sign in the regular expression).

define NOUNFRAGMENT

Figure 11:
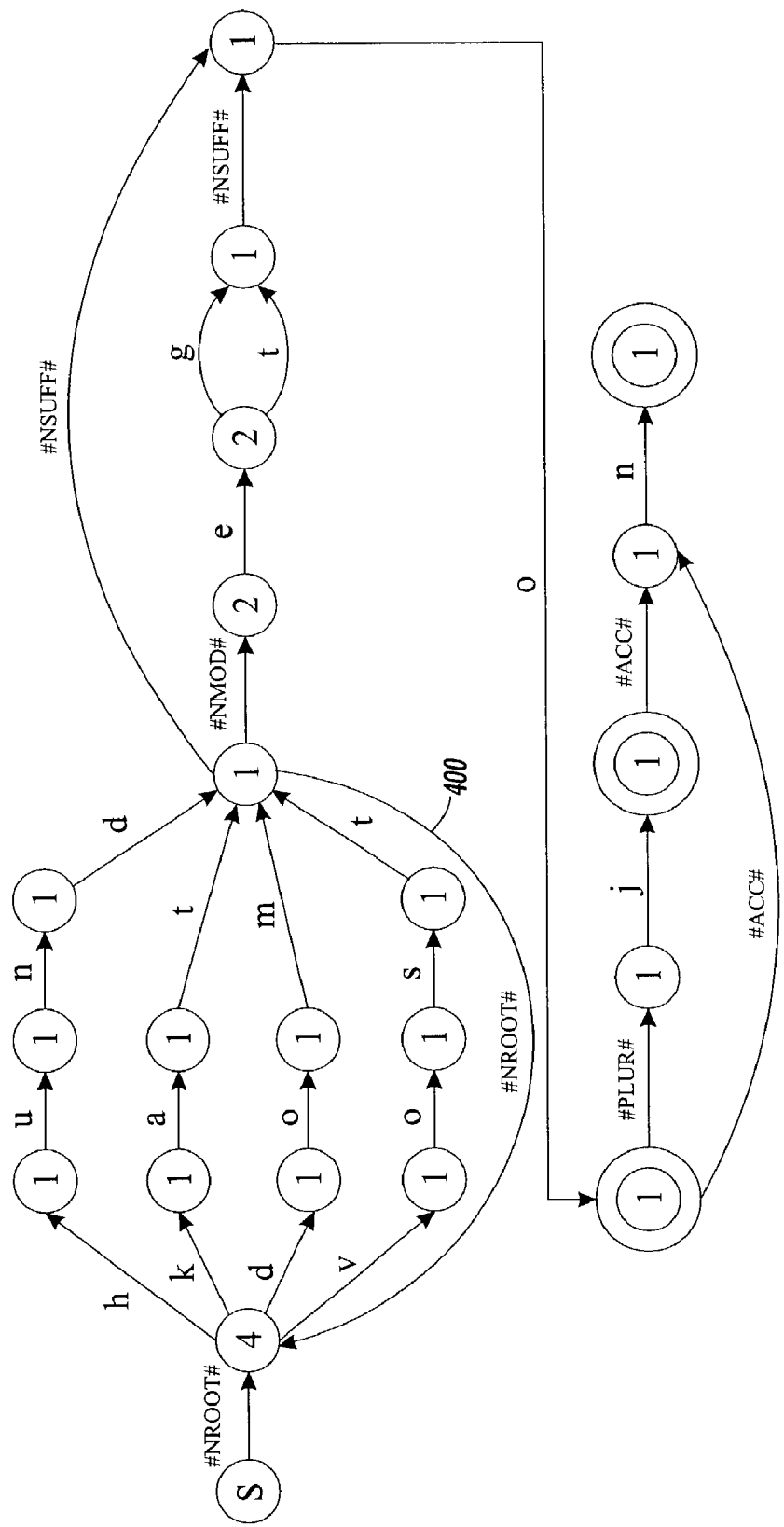
FIG. 11 illustrates an example of a network that could be used to effect substring-to-number mapping including looping in accordance with the present invention.

[#NROOT# NROOT]+(#NMOD# NMOD) #NSUFF# NSUFF (#PLUR# PLUR) (#ACC# ACC);

The resulting network after normal epsilon-arc removal would look like the network shown in FIG. 11, with a looping arc 400 from the end of the NROOT morphemes back to the start of the NROOT morphemes.

Using the compounding network shown in FIG. 11, lookup of hunddomojn ("doghouses", in the accusative case) would yield the string:

"#NROOT# hund #NROOT# dom #NSUFF# o #PLUR# j #ACC# n", and morpheme-to-number mapping would return separate index numbers for hund ("dog"), for dom ("house") and for the other morphemes, allowing appropriate related information to be retrieved for each element of the compound.

It is important to note that traditional word-number mapping does not allow such loops in the network because the language must be finite. In morpheme-to-number mapping of the present invention, however, each indexing domain must be finite, but entire indexing domains can be looped, as in the Esperanto-noun example shown in FIG. 11. Advantageously, substring number mapping can be performed with networks that encode infinite languages.

B.2 Partial Suppression of Morpheme-to-Number Mapping

When retrieving numbers for morphemes, there may be morphemes (or pseudo-morphemes) for which no glosses exist or for which no glosses are desired in a particular application. For example, some applications may not be interested in obtaining any kind of gloss for verb-inflection endings. And in German compounding, the "glue" morphemes that can appear between compound elements may also be of little or no interest as far as glossing is concerned.

In a modified version of the Esperanto example above, let us assume that the -o suffix (required on all nouns) is of no interest for a particular glossing application, and that the linguist does not want to see a gloss number returned for it. This can be implemented by using number diacritics that explicitly mark the end of a morpheme-indexing domain without starting a new one. If the beginning of a domain is marked #BEGIN.X#, then the end might be explicitly marked with #END.X#, as illustrated in the following NOUNFRAGMENT definition:

define NOUNFRAGMENT
    [#BEGIN.NROOT# NROOT #END.NROOT#]+(#BEGIN.NMOD# NMOD #END.NMOD#)
NSUFF
    (#BEGIN.PLUR# PLUR #END.PLUR#) (#BEGIN.ACC# ACC #END.ACC#)

In this variation, each gloss-bearing morpheme class is overtly bounded with beginning and ending diacritics, delimiting an indexing domain, and NSUFF remains an unindexed island. Germanic compound "glue" such as the "s" in Blldungsroman can be ignored in the same way.

More generally in this variation, at least one region of a finite-state network is not included in an indexing domain and thus is inactive for the purposes of substring-number mapping. In operation, when this finite-state network is applied to an input string, no labeled index is produced for such inactive regions.

B.3 Network Initialization for Substring-Number Mapping

The marking of counts on states is similar to the marking required for word-number mapping. The marking of counts for substring-number mapping is performed as follows:

(a) Working right-to-left, mark each state in an indexing (i.e., counting) domain with a count representing the number of paths that lead from that state to a real final state or to a substring final position; if the state is final or marks a substring final position increment the count by one;
(b) All states outside of an indexing domain are marked with a count of zero.

B.4 Morpheme-to-Number Mapping

Let a transducer network apply to a surface input string in the usual way, resulting in one or more lexical solution strings containing number diacritics, such as:
"#NROOT# hund #NROOT# dom #NSUFF# o #PLUR# j #ACC# n".

The start of a new indexing domain terminates any previous indexing domain. Alternatively, indexing domains may be bounded by both a begin and an end diacritic, e.g., #BEGIN.FOO# and #END.FOO#. Parts of the network may thus lie outside of any indexing domain.

Example program instructions for performing morpheme-to-number mapping are set forth in FIG. 12. Morpheme-to-number mapping re-applies the network to each of the solution strings, such as:

morph2num (Network, "#NROOT#hund#NROOT#dom#NSUFF#o#PLUR#j#ACC#n").

B.5 Networks Denoting Regular Languages and Transducers, Denoting Regular Relations Basic substring-to-number mapping takes a single string as input and returns a set of labeled indices (i.e., numbers) corresponding to substrings of the input string. Each substring comes from a predefined finite set of substrings, and the label indicates for each index which set it refers to.

Each index labeled X corresponds to a string from finite set X, and where set X has n members, the indices corresponding to strings from that set will range in value from 0 to (n−1). In a completely insignificant variation, the values could range from 1 to n.

Number-to-substring mapping is the reverse operating, taking a set of labeled indices and returning a set of substrings (which could be reassembled into a single string).

Just as the '184 patent extended the known technique of word-number mapping to transducers, substring-number mapping is naturally extended in the same way. Using the original extension disclosed in the '184 patent: Assume that transducer T encodes a mapping from strings of language A to strings of language B. If T is applied to an input string from language A, it will return one or more related words from language B. The extension disclosed in the '184 patent involves applying a transducer to an input string, getting as output a set of strings, and applying word-number mapping on each of the output strings. For example:

input string -> T -> set of output strings -> word-to-number mapping.

Where the network contains n paths, each of the output strings is assigned a unique index, 0 to n−1. Thus in the overall context of the transduction, a single input string is mapped to multiple indices, where each of the indices corresponds to a (whole) path associated with the input word.

The extension disclosed in the '184 patent involves an extension of word-number mapping, where an input word is looked-up, giving solution(s); and word-number mapping is performed on the solutions relative to the paths of the transducer.

Substring-number mapping is similarly extendable to transducers. If transducer T is applied to an input string, the output will be a set of one or more strings. For example:
input string -> T -> set of output strings.

If the set of output strings is then put through substring-to-number mapping, the result will be a set of labeled indices for each output string. Thus in the context of a transducer, substring-number mapping maps a single input string into a set of sets of labeled substring indices.

B.6 Completeness and Incompleteness

The division of the input string into indexed substrings may be complete, such that the concatenation of the substrings, in the original order, is equivalent to the original string.

The division of the input string into indexed substrings may not be complete; i.e. there may be sections of the original input string that are ignored for purposes of substring-to-number mapping.

Substring-number mapping encompasses both complete and incomplete divisions of the original input string into substrings. It's a matter of choice depending on the needs of a particular application.

If the substring-to-number mapping is complete, i.e. if the input string is completely divided into substrings, ignoring no sections of the input string, and a labeled index is obtained for each of the substrings, and the order of the indices is stored, then it is possible to map from the set of ordered labeled indices back to the original input string by: (a) mapping each labeled index back to its substring; and (b) concatenating the substrings, in their original order.

C. Applications of Substring-Number Mapping

As described above, substring-number mapping encompasses both substring-to-number and number-to-substring mapping. In the context of the present invention, substring-number mapping is performed using finite-state networks, which include both simple networks encoding regular languages and transducers encoding regular relations.

The numbers derived from substring-to-number mapping can be used to look up related information for each of the numbered substrings. In addition, the numbers can also be used (via number-to-substring mapping) to look up (i.e., retrieve) the original substrings themselves.

More generally, substring-number mapping has applications outside of looking up related information (e.g., glosses, translations, definitions, thesaurus sense groups, etc.). In addition, it will be appreciated by those skilled in the art that related information may be data stored in a combination of one or more forms that include textual data, image data, audio data, video data, and program instructions. Substring-to-number mapping can also be used to encode a word, as a set of labeled numbers, and then number-to-substring mapping (using the same network) can be used to decode it to get back the original substrings.

When the word is encoded as a set of labeled indices, the labeled indices could be transmitted to a receiver who has the same network and the original text could be restored.

C.1. Preparation Before Use

Figure 13:
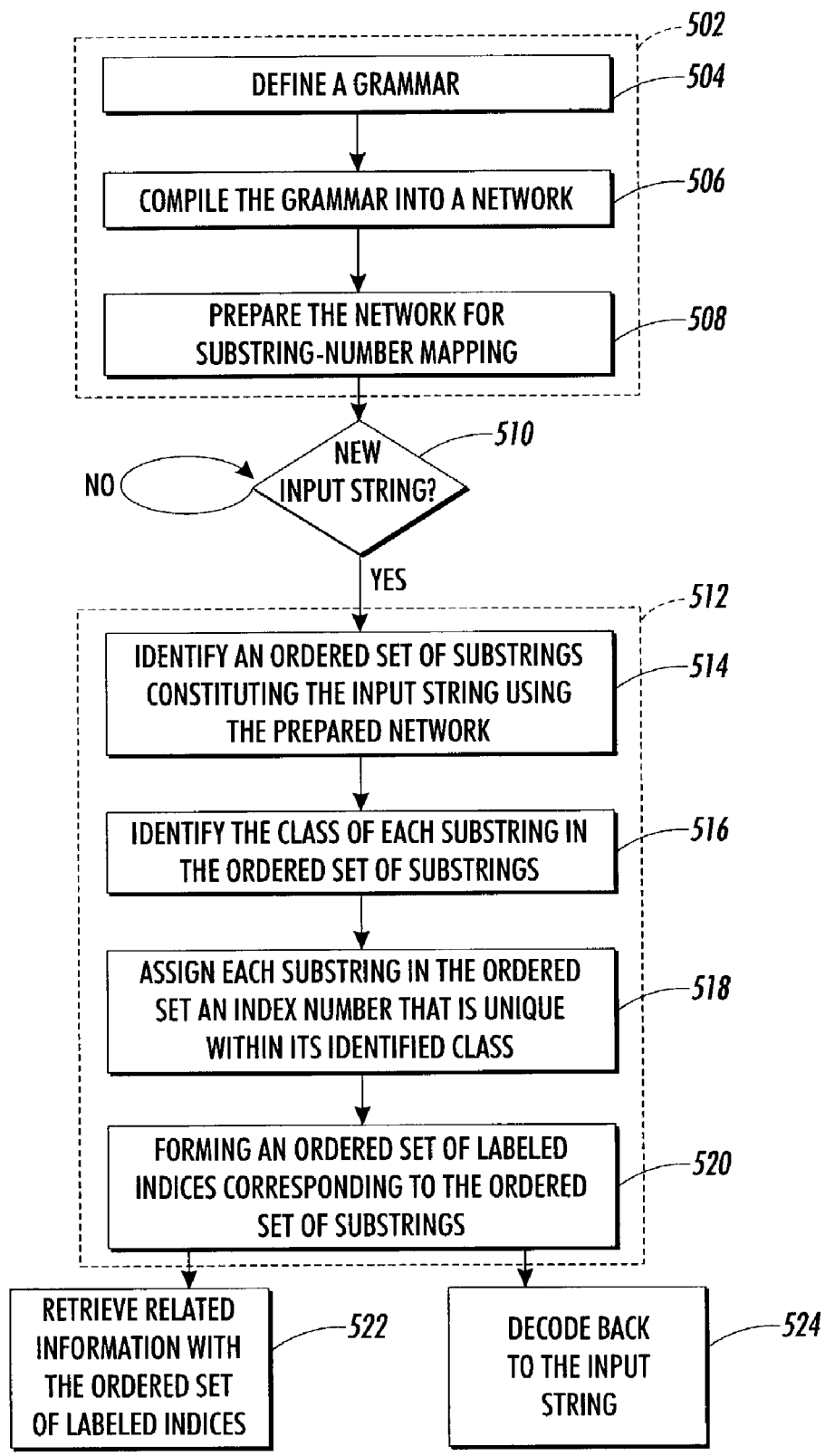
FIG. 13 sets forth a flow diagram that details preparation and use of a network for substring-number mapping.

FIG. 13 sets forth a flow diagram that details steps for the preparation and use of a network for substring-number mapping. The steps for preparation of a finite-state network for substring-to-number mapping are outlined at 502. Initially at 504 a grammar is defined that has a set of named substring classes and concatenations of morpheme classes that form valid words. Each of the named substring classes contains a finite number of substrings. The defined grammar at step 504 defines a language.

At 506, the grammar defined at step 504 is compiled into an acceptor network that accepts words in the language. Subsequently, the acceptor is prepared for substring-to-number mapping as set forth in section C.1 above. This preparation involves delimiting a unique indexing domain in the acceptor for each class of substrings, where each indexing domain corresponds to a set of states (represented using nodes) and transitions (represented using arcs) in the acceptor. Counts are added to the nodes of the acceptor relative to each indexing domain to complete preparation of the acceptor for substring-to-number mapping.

Generally at 512, the acceptor network prepared at 502 is applied to an input string received at 510. In applying the network to the input string, an ordered set of substrings constituting the input string is identified at 514. The class of each substring in the ordered set of substrings identified at 514 is identified at 516. At 518, each substring identified at 516 is assigned an index number that is unique within its class of identified substrings. The index number may for example lie in the dense range 0 to (n−1), where n is the number of substrings in the class. At 520, the index number for each identified substring is labeled to identify its class, thereby defining an ordered set of labeled indices.

The resulting ordered set of labeled indices may now be used in the different ways as described in more detail below. In a first embodiment at 522, each labeled index in the ordered set of labeled indices may be used to retrieve related information from a similarly labeled database, as described in section C.2 below. In a second embodiment at 524, the ordered set of labeled indices may be used as an encoding of the input string that can be decoded at any desired time using an inverse acceptor network that performs number-to-substring mapping back to the original input string, as described in section C.3 below. As noted in section B.5 above, the methods described in this section are naturally extended to transducers encoding regular relations.

C.2 Getting Back Related Information Via Perfect Hashing

Figure 14:
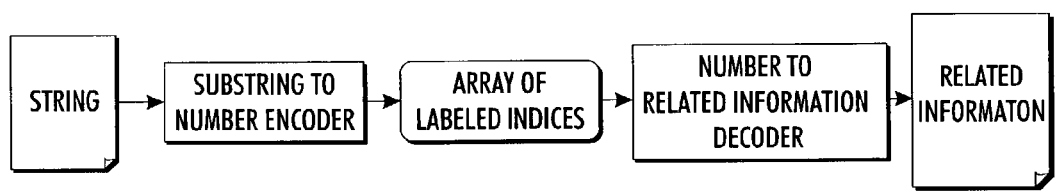
FIG. 14 is a block diagram that illustrates the use of substring-to-number encoding to retrieve related information.

FIG. 14 is a block diagram that illustrates substring-to-number encoding and retrieving related information. As shown in FIG. 14, strings are input into a substring-to-number encoder which generates an array of labeled indices, i.e. an ordered set of labeled indices corresponding to substrings of an original input string. The array of labeled indices may then be forwarded to a number-to-related information decoder which maps each labeled index to related information.

The term related information is used herein to include: glosses, translations, definitions, thesaurus sense groups, features, computer code, audio data, or any other kind of information that one might want to associate with a string or substring.

Whereas strings themselves can usually be stored quite efficiently in a finite-state network, storing related information of the strings in the network is usually impractical or inefficient.

It will be appreciated by those skilled in the art that strings and their morphemes may take a variety of forms. For example, strings may represent musical scores and the substrings may represent motifs. Also, string may represent nucleotide sequences or amino acid sequences that comprises bases preferably A, C, G and T.

C.2.1 Word-Number Mapping and Related Information

One application of word-number mapping is perfect hashing, where the number assigned to each whole word is used as an index into a table that contains the related information for the word.

As an example, assume that the network encodes a language of n words, being the set of headwords in a printed dictionary, and that each word has a text definition, as in a common printed dictionary. These definitions are the related information.

The definitions can be stored in an array of strings, where the array is indexed by the integers 0 to n−1. Word-to-number mapping will map each whole string of the language to a number from 0 to n−1, and if the word numbering and the array of definitions are in synch, then the index can be used to retrieve the definitions associated with each word. For example, an array of definition mapping may take the form: input word -> T -> index ->[0, 1, 2, 3, . . . n−1].

Traditional (imperfect) hashing takes an input string and derives a number from it, using that number as an index into a hash table. Traditional hashing is imperfect, capable of mapping two input strings to the same number (thereby producing a "collision"). Traditional hashing often makes incomplete use of the storage array, with some of the slots left empty. The hashing implemented with word-to-number mapping is perfect, with no collisions or wasted slots in the hash table.

In practice, the array indexed 0 to n−1 can contain pointers to definitions stored in other convenient locations. This is a variant of the technique.

C.2.2 Substring-Number Mapping and Related Information

Substring-to-number mapping differs from traditional word-to-number mapping in returning multiple labeled indices for a single string, where the indices correspond to substrings of the original string. For a natural language where words consist of a prefix, a root, and a suffix, a typical word would be mapped to three labeled indices as shown in Table 1.

TABLE 1

| P4 | R2345 | S37 |
|---|---|---|
| prefix | root | suffix |

In the example, P4 indicates that the prefix is string number 4 from the finite class of prefix substrings, R2345 indicates that the root is number 2345 from the set of root substrings, and S37 indicates that the suffix is number 37 from the set of suffix substrings. The P class will have n members, and the indices will range from P0 to P(n−1); the R class will have m elements, and the indices will range from P0 to P(m−1), and the S class will have q elements, and the indices will range from S0 to S(q−1). In a natural language, there may be dozens of different substring classes that correspond to morphemes (but substring-number mapping doesn't necessarily have anything to do with natural language).

In the context of substring-to-number mapping, a single input string gets mapped to a set of labeled indices, and each of those labeled indices can be used to retrieve related information associated with the original substring. The related information for each class of substrings is stored in a separate array, indexed 0 to n−1, where n is the number of strings in the class, and the label indicates, for each index, the array in which to look up the related information. For example, the mapping may take the form:

input word -> T -> P4 R2345 S37, where:
the array P of Prefix Related Information corresponds to [0, 1, 2, 3, . . . n−1];
the array R of Root Related Information corresponds to [0, 1, 2, 3, . . . m−1]; and
the array S of Suffix Related Information corresponds to [0, 1, 2, 3, . . . q−1].

Thus, instead of looking up just related information for the whole word (as in traditional word-number mapping), related information for each indexed substring can be looked up using substring-number mapping.

C.3 Encoding

Figure 15:
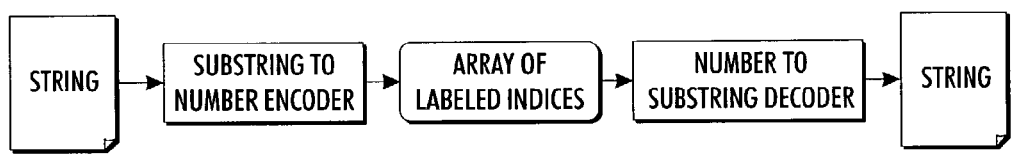
FIG. 15 is a block diagram that illustrates reversible substring-to-number encoding.

FIG. 15 is a flow diagram that illustrates reversible substring-to-number encoding. The structure is similar to FIG. 14. Instead of being forwarded to a number-to-related information decoder, the array of labeled indices is forwarded to a number-to-substring decoder. The output of the number-to-substring decoder is the same as the original input. As shown, substring-to-number mapping, and the older word-number mapping, need not necessarily be used for retrieving related information. The reduction of substrings (or whole strings) to numbers is also a useful form of text encoding.

For example, assume that an English text is encoded in ASCII characters, which encoding uses one byte per letter. One English corpus (from a translation of War and Peace) contains about 305,000 orthographical words (tokens), with an average length of about 5 letters. To transmit each word, with a following space or punctuation mark, will then take about 6 bytes per word or about 1.8 megabytes for the entire text.

It will be appreciated that many of the words (tokens) appear multiple times; "The" appears 1427 times and "the" appears 15624 times. When duplicates are removed, there are just 14238 word "types" in the whole book. This language of 14238 words can be built into a network that performs word-to-number mapping, which will let us assign a type-token-number to each token in the text. The values 0 to 14237 can be stored in two bytes (in fact, in just 14 bits, but even these two "extra" bits can be used for punctuation). Thus each word can be transmitted in just two bytes, rather than 6. To transmit the words as numbers, therefore, would require roughly 600 Kbytes, or one-third the original size. (The transmission of the spaces and punctuation have been ignored in this example, but most words are followed by a space, period or comma, that that could be encoded in the two extra bits, with other rarer separators encoded as separate tokens.)

A recipient with the same network could de-compress the text, turning the numbers back into words.

In addition to the compression, the transmitted text is essentially encrypted.

In substring-to-number mapping, a single word is typically mapped to a set of labeled indices. Again, instead of transmitting the original text, one would transmit the sequences of labeled indices, which could be mapped back to substrings (and so to words) by a recipient with the same network.

D. Miscellaneous

Using the foregoing specification, the invention may be implemented as a machine (or system), process (or method), or article of manufacture by using standard programming and/or engineering techniques to produce programming software, firmware, hardware, or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for encoding an input string, comprising:
   specifying a plurality of indexing domains in a finite-state network; each indexing domain having a delimited set of states and transitions that corresponds to a class of substring; and
   applying the finite-state network to the input string to produce a set of labeled indices; the label of each labeled index in the set of labeled indices identifying a class of substring and its associated index identifying a unique substring in the identified class;
   wherein each labeled index in the set of labeled indices corresponds to one of the indexing domains in the finite-state network.

2. The method of claim 1, further comprising retrieving related information using the set of labeled indices.

3. The method of claim 2, wherein said applying produces an ordered set of labeled indices.

4. The method of claim 2, wherein the related information comprises one of a gloss, a translation, a definition, a thesaurus sense group, and a set of features of a substring.

5. The method of claim 4, wherein the related information is stored as one of text, image data, audio data, video data, and program instructions.

6. The method of claim 1, wherein the finite-state network encodes one of a language and a relation involving the language.

7. The method of claim 6, wherein the language is a natural language.

8. The method of claim 7, wherein each substring is a morpheme of a word in the natural language.

9. The method of claim 8, wherein related information is retrieved for each morpheme using the set of labeled indices.

10. The method of claim 9, wherein the related information represents one of a translation and a gloss of each substring of the input string into another language.

11. The method of claim 9, wherein the related information represents arbitrary data being associated with the mapped morphemes.

12. The method of claim 6, wherein the language encoded by the finite-state network comprises an infinite number of strings.

13. The method of claim 6, wherein the relation encoded by the finite-state network comprises an infinite number of ordered string pairs.

14. The method of claim 6, wherein the language encoded by the finite-state network comprises strings that represent musical scores and substrings that represent motifs.

15. The method of claim 6, wherein the language encoded by the finite-state network comprises strings that represent one of nucleotide sequences and amino acid sequences.

16. The method of claim 1, further comprising assigning a count to each state in the finite-state network; each count being defined relative to the unique indexing domain in the finite-state network that belongs to one of the plurality of classes of substrings.

17. The method of claim 1, further comprising compiling the finite state network before specifying the plurality of indexing domains therein.

18. The method of claim 1, further comprising encoding an input word with the set of labeled indices.

19. The method of claim 18, further comprising decoding the set of labeled indices with the finite-state network to produce the input word.

20. The method of claim 19, wherein said applying produces an ordered set of labeled indices.

21. The method of claim 1, further comprising introducing diacritics into the finite-state network to identify substring start and substring final positions.

22. The method of claim 1, further comprising excluding at least one region of the finite-state network from being specified as one of the plurality of indexing domains; the at least one excluded region not producing a labeled index when the finite-state network is applied to the input string.

23. The method of claim 22, further comprising introducing diacritics into the finite-state network to identify substring start and substring final positions; wherein at least one of the diacritics marks a first indexing domain's end without marking a second indexing domain's start.

24. A system for encoding an input string, the system comprising:
   a memory for storing program instructions; and
   a processor for executing program instructions for:
   specifying a plurality of indexing domains in a finite-state network; each indexing domain having a delimited set of states and transitions that corresponds to a class of substring; and
   applying the finite-state network to the input string to produce a set of labeled indices; the label of each labeled index in the set of labeled indices identifying a class of substring and its associated index identifying a unique substring in the identified class;
   wherein each labeled index in the set of labeled indices corresponds to one of the indexing domains in the finite-state network.

25. An article of manufacture for use in a machine comprising:
   a memory;
   instructions stored in the memory for encoding a string, the instructions being machine readable, the method comprising:
   specifying a plurality of indexing domains in a finite-state network; each indexing domain having a delimited set of states and transitions that corresponds to a class of substring; and
   applying the finite-state network to the input string to produce a set of labeled indices; the label of each labeled index in the set of labeled indices identifying a class of substring and its associated index identifying a unique substring in the identified class;
   wherein each labeled index in the set of labeled indices corresponds to one of the indexing domains in the finite-state network.

* * * * *